United States Patent [19]

McLoughlin

[11] 3,726,537

[45] Apr. 10, 1973

[54] GOLF CART

[76] Inventor: Bernard J. McLoughlin, c/o Hustler Golf Shop, Box 995, Troy, N.Y. 12181

[22] Filed: Feb. 9, 1971

[21] Appl. No.: 113,838

[52] U.S. Cl. ............................ 280/47.26, 280/DIG. 6
[51] Int. Cl. .............................................. B62b 1/16
[58] Field of Search ..................... 280/35, 38, 40, 39, 280/41 R, 41 C, 42, 47.26, 63, DIG. 6; 248/98

[56] References Cited

UNITED STATES PATENTS 2,575,930  11/1951  Schwartz ........................ 280/47.26

*Primary Examiner*—Leo Friaglia
*Assistant Examiner*—Robert R. Song
*Attorney*—Robert E. Heslin

[57] ABSTRACT

An improved golf cart including a frame for a golf bag, said frame including a pair of parallel, spaced-apart rods and two ring shaped supports. Welded to the rods is a bag supporting means in the form of an adaptor for mounting the bag on a carriage frame. The carriage includes a pair of wheels, each with its respective axle. Each of the axles forms a portion of an arm. The arms are joined together and a single shaft is engaged with the adapter to support the bag on the carriage frame. A handle is associated with the common shaft connected to each of the arms and with the adapter so as to control the orientation of the golf bag and cart.

2 Claims, 5 Drawing Figures

PATENTED APR 10 1973
3,726,537
Fig.1.
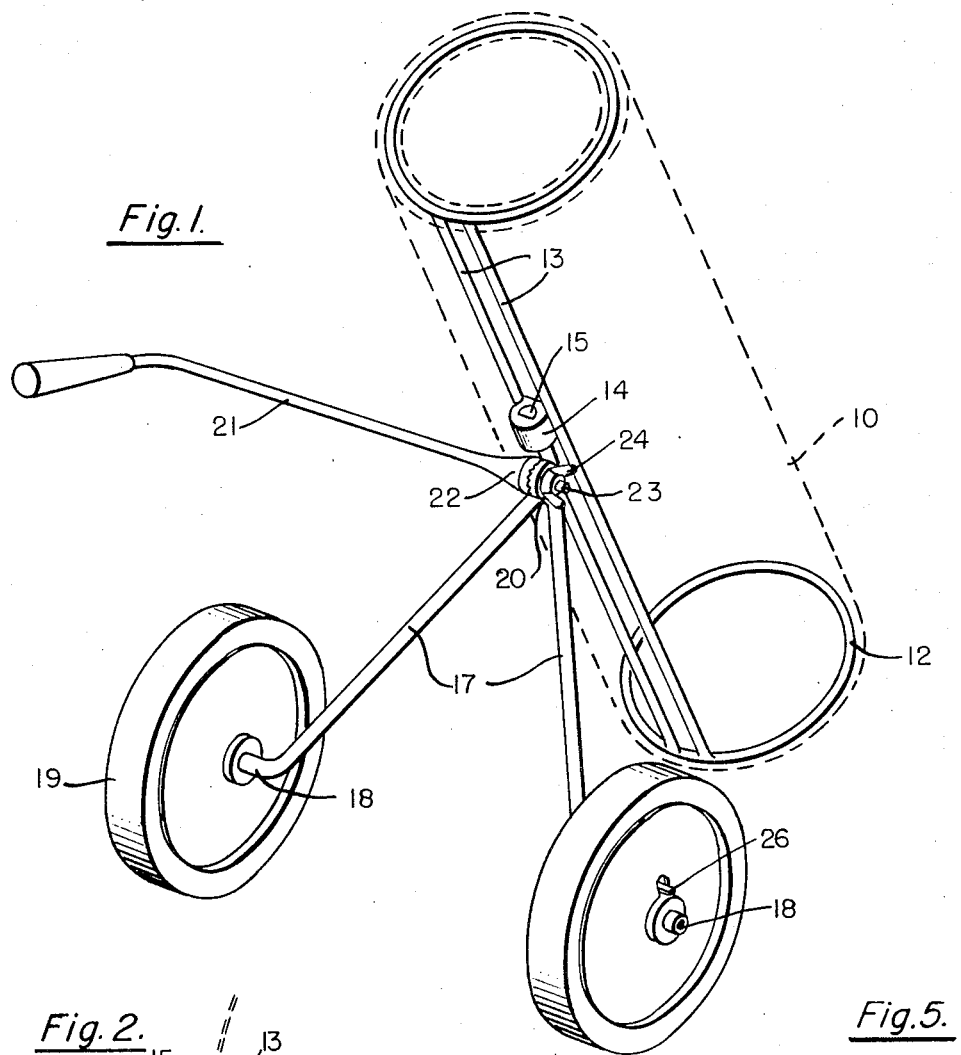
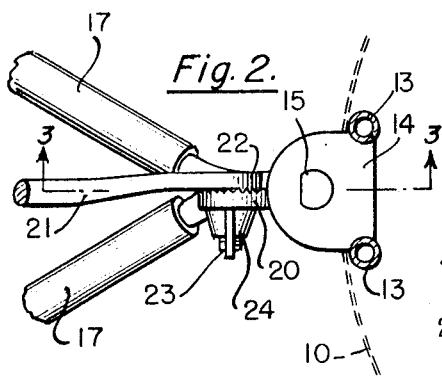
Fig.2.
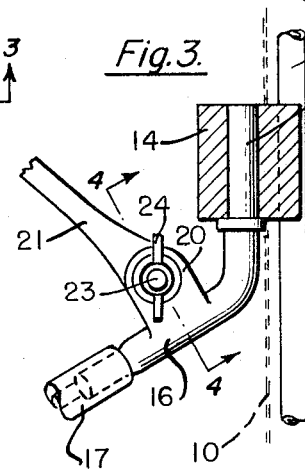
Fig.3.
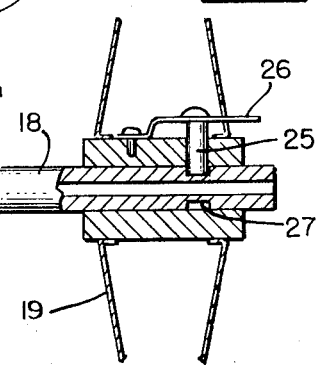
Fig.5.
Fig.4.
Inventor:
Bernard J. McLoughlin,
by _George Hunter Santer_
His Attorney.

GOLF CART

BACKGROUND OF THE INVENTION

As golfing equipment has become more and more extensive and varied, the mere burden of carrying this equipment along with the player from place to place on the golf course has become a physical burden which has been sought to be alleviated by the use of golf carts. The present invention deals with a golf cart of the simpler variety, being capable of transporting a golfer's equipment, including his golf bag, golf clubs, balls, etc.

One of the prime requirements of the simpler class of golf carts is that it be readily transportable to and from the golf course. Conveniently, equipment of this type is usually transported in the trunk portion of an automobile. For that reason, golf carts of the present type must not only be readily capable of assembly and disassembly, but must also be capable of being stowed in small spaces.

Another prime requirement of a golf cart of this class is that it not only be capable of convenient assembly and disassembly, but must also rigidly carry the golf bag and equipment. In addition to the foregoing requirements, a golf cart must also be sufficiently sturdy to withstand the rigors of traversing golf courses, including traversing terrain of differing slopes and consistencies such as rocky or muddy ground.

In addition to the foregoing, the golf cart must also be light in weight, for, if they are to be materially helpful, they must reduce the exertion required of the golfer and, if in fact the weight of the golf cart becomes excessive, the golfer may be at a disadvantage in using the golf cart, as opposed to merely carrying the bag himself.

SUMMARY OF THE INVENTION

The golf cart of the present invention meets the foregoing requirements in that it is readily assembled and disassembled, is readily transportable in the disassembled condition, is sufficiently sturdy to withstand the use to which golf carts are normally put and in addition, can withstand traversing the variety of terrains under varying weather conditions. Furthermore, the golf cart of the present invention makes certain that the bag is suitably supported so as to be easily maneuvered in a variety of attitudes.

The golf cart of the present invention meets the foregoing objects by reason of its simple, although sturdy, construction which allows the components of the cart to cooperate together to produce the desired results. The bag itself carries, in the interior thereof, a portion of the golf cart. Particularly, a pair of ring members located respectively at the lower and upper portions of the golf bag are spaced apart by a pair of parallel rods running the length of the golf bag from the upper ring to the lower ring. These rods are spaced apart a short distance, and connecting the two rods, at a convenient distance along their length, is a bag support means in the form of an adapter. The adaptor protrudes through the golf bag covering so as to engage with the carriage of the golf cart. A pair of arms form a major portion of the carriage frame. Each of the arms has, at one end thereof, a portion which comprises an axle. Each axle has a respective wheel suitably fastened thereon. The arms are interconnected to form a common shank which interconnects with the bag support means. The only other element in the golf cart is a handle which is engaged with the common shank and the bag support means in a well-known manner.

BRIEF DESCRIPTION OF THE DRAWINGS

FIG. 1 is a perspective view of the golf cart constructed in accordance with the present invention, showing how the cart cooperates with the bag shown in dotted outline;

FIG. 2 is a detailed view showing the bag support means, and its interconnection with the arms of the carriage frame and the handle;

FIG. 3 is a section taken on lines 3—3 of FIG. 2;

FIG. 4 is a section taken in lines 4—4 of FIG. 3; and

FIG. 5 is a cross section showing how the wheels are attached to the axles for ready disassembly.

DETAILED DESCRIPTION OF THE INVENTION

FIG. 1 shows a perspective view of a golf cart constructed in accordance with the teachings of the present invention and its cooperation with a golf bag, shown in dotted outline. A pair of circular, or similarly shaped, bag support rings 11 and 12 are parallel to each other, as shown in FIG. 1. Ring 11, the upper ring, is on the interior of the bag at the mouth thereof. Lower ring 12 is parallel to upper ring 11 and spaced apart to lie at the lower portion and interiorly of the golf bag. Interconnecting these bag support rings is a pair of rod members 13. The rods are parallel to each other and spaced apart a sufficient distance to allow bag support means or adaptor 14 to be suitably interconnected therebetween. The means 14 can be welded or otherwise rigidly united with the pair of rods 13. As shown in FIG. 2, the bag support means 14 is intended to protrude through the outer covering 10 of the golf bag.

The bag support means 14 has a keyed slot therein capable of receiving shank 16, as shown in FIG. 3. Shank 16 is interconnected to each of two arms 17 which extend downwardly and outwardly as shown in FIG. 1. Each of the arms 17 has one portion 18 bent at an angle to the remaining portion of the arm. Each of the bent portions 18 of the arms 17 is so bent that when each of the arms 17 is fastened onto shank 16, the bent portions of each of the arms 17 are coaxial, and form axle portions 18. Onto each of the axle portions 18 a wheel 19 is mounted. The only other element shown in FIG. 1 is handle 21 which is connected to the shank 16 in a well-known manner.

FIG. 2 shows, in more detail, the interconnection of the arms 17, the bag support means 14, and the handle 21. As discussed previously, the bag support means 14 includes a keyed slot 15 therein which is adapted to receive one portion 16' of shank 16. Of course, the shank portion 16' will be fabricated to correctly interfit with the slot 15. The portion of the shank 16 opposite the keyed portion is formed into a pair of studs. Each of the studs is connected to one of the arms 17. This connection can be made by welding or any other well-known technique, i.e., it can be threaded, attached by bolts, etc. The embodiment of the invention disclosed in the drawings shows each of the studs fitting into the arms which are shown as tubular and such a rigid connection could be effected by welding.

As shown in FIG. 3, the shank 16 has an ear portion 20. The inner portion of the ear 20 is serrated as shown in FIG. 2. The serrated edges of the inner portion of the ear 20 mate with the serrated edges of member 22 which is one end of the handle 21. A threaded stud 23, integral with handle portion 22, and a wing nut 24, secure the handle 21 and the ear 20 of the shank 16 in adjustable relation to one another.

FIG. 3 also shows the relationship between the outer cover 10 of the golf bag; the golf bag rods 13, the bag support means 14, the portion 16' of the shank 16 and the connection of shank 16 to a frame 17, and the connection of handle portion 22.

FIG. 5 shows, in cross section, the apparatus used to releasably fasten each of the wheels 19 onto its axle portion 18. The portion 18 of the arms 17 which form the axle, has a circumferential slot 27. Each wheel has a pin 25 adapted to engage the circumferential slot 27 when the wheel is properly placed upon the axle 18. The pin 25 is spring-biased to retain the wheel 19 on the axle 18 during normal operation of the golf cart. To remove a wheel 19 from its axle 18, it is only necessary to lift the spring 26 which protrudes through the side wall of wheel 19. This will disengage pin 25 from circumferential slot 27 and allow the wheel 19 to be removed from axle 18.

Now that the constructional details of the golf cart have been explained, its operation will now be explained in detail. It is assumed that the user has a bag fitted with upper and lower rings 11 and 12 and a pair of rod members 13 and bag support means 14. It will further be assumed that he has available the handle 21, a pair of frames 17 each with a bent axle portion 18, and a pair of wheels 19 with the apparatus disclosed with reference to FIG. 4. To begin assembly, he places each of the wheels 19 on a respective axle portion 18 of one of the arms 17. This can be done by raising spring 26 to lift pin 25 a sufficient distance to allow the axle 18 to slip thereunder. Subsequently the spring 26 is released allowing it to force pin 25 against the axle 18. As the wheel 19 slides along the axle, the pin 25 will engage with the circumferential slot 27 thereby locking the wheel 19 onto the axle 18. When each of the wheels has been attached to its respective axle 18, the shank portion 16 is engaged with the bag support means 14 by inserting the keyed portion 16' thereof into the keyed slot in the bag support means 14. The handle is then attached by slipping it over the bolt formed in the shank 16 and attaching the wing nut 24. The handle is easily adjusted to different attitudes by releasing the wing nut and adjusting the handle and then retightening the wing nut.

To disassemble the golf cart, after its use, it is only necessary to reverse the procedure; i.e., the handle 21 is removed from the golf cart by removing wing nut 24 and then removing the handle, then the shank 16 is separated from the bag support means 14 by lifting the bag and bag support means away from the keyed portion 16' of the shank. Subsequently, each of the wheels 19 is removed from its respective axle 18 by forcing spring 26 upwards to release pin 25 from circumferential groove 27 in the axle 18.

Thus, applicant has disclosed a golf cart which is readily assembled and disassembled, is sturdy and is capable of withstanding the use to which golf carts are ordinarily put. The golf cart, although adapted for use with a bag which has been specially fitted with a bag support means and upper and lower rings 11 and 12, a pair of frame rods 13 with bag support means 14 attached thereto, can be adapted, it is readily apparent, for use with golf bags now in use. It would only be necessary to provide a frame including upper and lower rings 11 and 12 separated by a pair of rods 13, inserting this apparatus into a bag and providing an opening through the bag wall at an appropriate location to allow the bag support means 14 to protrude therethrough. Once the foregoing has been provided in a golf bag of the type presently now in use, such a golf bag can be used with a golf cart constructed in accordance with the teachings of the present invention.

I claim:

1. A golf cart for use with an at least partially rigid golf bag having an externally positioned first coupling member comprising in combination,
   carriage means having a supporting frame and a plurality of wheels rotatably mounted thereon,
   a second coupling member on said carriage means which is detachably connectable to said first coupling member,
   one of said coupling members comprising a shank slidably fitting into a corresponding mating aperture in the other said coupling member,
   said shank fitting in a keyed relationship into said mating aperture to provide a non-rotating relationship therebetween.

2. The golf cart of claim 1 in which said carriage means includes two outwardly extending tubular portions which extend at an acute angle to each other,
   a pair of tubular supporting leg members each adapted to be detachably coupled to a respective one of said tubular portions,
   each supporting leg member having an end portion which is coaxially aligned with the end portion of the other leg member when both are coupled to their respective tubular portions,
   and a wheel detachably and rotatably supported on each of said end portions.

* * * * *